United States Patent
Ari-Pekka et al.

(10) Patent No.: US 7,454,748 B2
(45) Date of Patent: Nov. 18, 2008

(54) SYSTEM AND METHOD FOR SPECIFYING VIRTUAL MACHINES

(75) Inventors: Simonen Ari-Pekka, Tampere (FI); Mikko Rintamaki, Tampere (FI)

(73) Assignee: Nokia Corporation, Espoo (FI)

( * ) Notice: Subject to any disclaimer, the term of this patent is extended or adjusted under 35 U.S.C. 154(b) by 762 days.

(21) Appl. No.: 10/900,472

(22) Filed: Jul. 27, 2004

(65) Prior Publication Data

US 2006/0026592 A1    Feb. 2, 2006

(51) Int. Cl.
*G06F 9/45* (2006.01)
(52) U.S. Cl. ...................................... 717/174
(58) Field of Classification Search ................ 717/174; 715/700
See application file for complete search history.

(56) References Cited

U.S. PATENT DOCUMENTS

| | | | | |
|---|---|---|---|---|
| 6,433,794 B1 * | 8/2002 | Beadle et al. | ................ | 715/700 |
| 6,983,460 B1 * | 1/2006 | Goire et al. | ................ | 717/175 |
| 7,165,099 B2 * | 1/2007 | Sprigg et al. | ................ | 709/219 |
| 2002/0095396 A1 * | 7/2002 | Frerking et al. | ................ | 707/1 |
| 2004/0044643 A1 * | 3/2004 | deVries et al. | ................ | 707/1 |
| 2005/0097082 A1 | 5/2005 | Yan | | |

FOREIGN PATENT DOCUMENTS

EP    1 049 005    11/2000

OTHER PUBLICATIONS

Programming Wireless Devices with the Java 2 Platform, Micro Edition, Riggs et al., May 2001, 2 pgs.
Preface and Chapter 8 "MIDP Application Mode," Programming Wireless Devices with the Java 2 Platform, Micro Edition, Riggs et al., May 2001, pp. 83-100.s.

* cited by examiner

*Primary Examiner*—John Chavis
(74) *Attorney, Agent, or Firm*—Foley & Lardner, LLP

(57) ABSTRACT

The techniques described include a method and system for allowing applications which require or work better with different virtual machines to be successfully installed on a device in such a way that different applications may be executed in different virtual machines. The method comprises identifying an application and based on the identification, identifying the virtual machine which is best suited to execute the application. The application is installed such that the application is executed in the identified virtual machine when the application is launched.

20 Claims, 4 Drawing Sheets

| Class Files Implementing the MIDlet(s) 302 | Resource Files Used by the MIDlet(s) 304 |
|---|---|

File Manifest 306

MIDlet Name: _____

MIDlet Version: _____

MIDlet Vendor: _____

MIDlet Icon: _____ 308

MIDlet Description: _____

MIDlet Info URL: _____

MIDlet <n>: _____

MIDlet Jar URL: _____

MIDlet Jar Size: _____

MIDlet Data Size: _____

Microedition Profile: _____

Microedition Configuration: _____

MIDlet Virtual Machine: _____ 310

FIG. 3

SYSTEM AND METHOD FOR SPECIFYING VIRTUAL MACHINES

BACKGROUND OF THE INVENTION

1. Field of the Invention

The present invention relates generally to management of computer applications. More particularly, the present invention relates to a system and method for specifying virtual machines so that an application is executed in the virtual machine best suited for that application.

2. Description of the Related Art

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

Java is a simple, object-oriented, distributed, interpreted, robust, secure, architecture-neutral, portable, multithreaded, dynamic, buzzword-compliant, general-purpose programming language developed by Sun Microsystems in the 1990's. Java supports programming for the Internet in the form of platform-independent Java "applets". Java is similar to C++ without operator overloading (though it does have method overloading), without multiple inheritance, and extensive automatic coercions.

Java programs can run stand-alone on small computers. The interpreter and class support take about 40 kilobytes (Kb); adding the standard libraries and thread support (essentially a self-contained microkernel) adds an additional 175 Kb. Java extends C++'s object-oriented facilities with those of Objective C for dynamic method resolution. Java has an extensive library of routines for TCP/IP protocols like HTTP and FTP. Java applications can access objects across the Internet via URLs as easily as on the local file system.

The Java compiler and linker both enforce strong type checking in that procedures must be explicitly typed. Java supports the creation of virus-free, tamper-free systems with authentication based on public-key encryption. The Java compiler generates an architecture-neutral object file executable on any processor supporting the Java run-time system. The object code consists of byte-code instructions designed to be both easy to interpret on any machine and easily translated into native machine code at load time.

Java applications may come in many forms depending on the application's configuration and profile. The configuration is the specification that defines the minimal feature set of a complete Java runtime environment A configuration may be thought of as a vertical set of application programming interfaces (APIs) that provide the base functionality for a particular range of devices that share similar characteristics, such as memory footprint and network connectivity. A configuration also defines a Java virtual machine to be used on different types of devices and says what the virtual machine can do and what the virtual machine needs. The configuration used in a device depends on the amount of memory on the device and in general, a configuration requiring a system with more memory is more comprehensive in its features. For instance, connected limited device configuration (CLDC) is used in devices which have memory of about 160 Kb and upwards. Such devices include cell phones, 2-way pagers, and cheap home appliances. Connected device configuration (CDC) is used in devices which have about 2 Megabytes (Mb) of memory and upwards. Such devices include expensive home appliances and car navigation systems. Regardless of the configuration, all applications on a device are generally executed in the same virtual machine.

A profile is a specification that details the Java technology application programming interfaces (APIs), built on top of and utilizing the underlying configuration, necessary to provide a complete runtime environment for a specific kind of device. Profiles specify both APIs and the configuration if offered. A profile must be complete in the sense that an application written to the specification can execute in the specified Java technology environment without the addition of other Java classes. Profiles can be thought of as selecting classes from APIs to form a complete environment.

The Mobile Information Device Profile (MIDP) for example, provides a standard platform for small, resource-constrained, wireless mobile information devices. One can think of the CLDC as a horizontal set of classes, and the MIDP, which is built on top of CLDC, as a vertical set of classes. This means that MIDP has access to all the classes provided by the CLDC. Another type of profile is the Java personal profile. Personal profile, which is built on top of CDC, is a set of Java APIs that supports resource-constrained devices with a graphical user interface (GUI) toolkit based on the abstract window toolkit (AWT). Combined with the CDC, Java 2 Micro Edition (J2ME) personal profile provides a complete J2ME application environment for consumer products and embedded devices. Other CDC based profiles include foundation profile and personal basis profile.

One type of application is the MIDlet. A MIDlet is CLDC based and is the basic unit of execution in MIDP. MIDlets may be bundled into MIDlet suites, which in turn are encapsulated within Java archive (JAR) files. MIDlet suites, which may contain numerous MIDlets, include the appropriate components for the target user, device, network, and locale. FIG. 1 illustrates the components of a conventional JAR file. A MIDlet suite's JAR file 100 will generally contain the class files implementing the MIDlet(s) 102, any resource files used by the MIDlet(s) 104, and a file manifest 106 describing the JAR file contents.

The JAR file manifest 106 provides a means to encode information about the contents of the JAR file. In particular, the JAR file manifest specification provides for name-value pairs, or tags, which a configuration uses to encode MIDlet attributes. Several attributes commonly found in a JAR file manifest 106 are shown in FIG. 1. MIDlet Name 108 is the name of the MIDlet suite and identifies the MIDlet(s) to the user. MIDlet Version 110 is the version number of the MIDlet suite and can be used by the system for installation, upgrades, and communication with the user. MIDlet Vendor 112 is the name of the MIDlet suite provider. MIDlet Icon 114 is the name of a portable network graphics (PNG) file to be used as the icon to identify the MIDlet suite to the user. MIDlet Description 116 is a short description of the MIDlet suite. MIDlet Info URL 118 is a uniform resource locator (URL) for information further describing the MIDlet suite. MIDlet <n>120 is the name, icon, and class of the $n^{th}$ MIDlet in the JAR file. MIDlet Jar URL 122 is the URL from which the JAR file was loaded. MIDlet Jar Size 124 is the size of the JAR file in bytes. MIDlet Data Size 126 is the minimum number of bytes of persistent data required by the MIDlet. Microedition Profile 128 is the Java 2 Micro Edition (J2ME) profile required. Lastly, the Microedition Configuration 130 is the J2ME configuration required.

Java applications are executed in a virtual machine, which is a specification for software that interprets programs that have been compiled into byte-codes. Devices are generally equipped with only one virtual machine to execute all of the applications used by the device. This is due to memory constraints in devices and the fact that one of the Java design goals is to have one virtual machine for all applications. However, memory constraints are no longer a major limitation, as even small devices can now contain large memories. Also, different configurations work better with different virtual machines and not all virtual machines can run both CDC and CLDC based applications. However, traditional application installation and execution has no way to account for this, so performance may be less than optimal.

During installation, an application is installed and will subsequently be launched and executed in the virtual machine on the device. This happens the same for all applications, regardless of the configuration or profile. This prevents optimal performance because, as mentioned above, different configurations run better with different virtual machines and a given virtual machine may not support all configurations and profiles. Also, even if a device does have more than one virtual machine to accommodate various applications, there is no way to specify which virtual machine should execute a particular application. Thus, there is a need for more than one functional virtual machine on devices which contain both connected device and connected limited device configurations. Further, there is a need to specify which virtual machine on a device should execute a particular application. Further yet, there is a need to ensure that the specified virtual machine executes the application each time the application is launched.

SUMMARY OF THE INVENTION

In general, exemplary embodiments described herein allow applications that require or work best with different virtual machines to be installed on the same device such that different applications may be executed in different virtual machines. One exemplary embodiment relates to a method of allowing applications to be executed in a specified virtual machine. The method comprises identifying an application and based on that identification, identifying a virtual machine best suited to execute the application. The method further comprises installing the application, wherein the application is executed in the identified virtual machine when the application is launched. As a result, applications requiring different virtual machines can be successfully installed on a device.

Another exemplary embodiment relates to a system for allowing an application to be executed in a specified virtual machine. The system comprises memory configured to contain an application and a virtual machine. The system further comprises a processor configured to execute instructions. The processor is instructed to identify an application and based on the identification, identify the virtual machine best suited to execute the application. The processor is further instructed to install the application such that when the application is launched, the application is executed in the identified virtual machine. As a result, applications requiring different virtual machines can be successfully installed on a device.

Yet another exemplary embodiment relates to a device that utilizes virtual machine specification. The device comprises memory configured to contain an application and a virtual machine. The device further comprises a processor configured to execute instructions. The processor is instructed to identify an application and based on the identification, identify the virtual machine best suited to execute the application. The processor is further instructed to install the application such that when the application is launched, the application is executed in the identified virtual machine. As a result, applications requiring different virtual machines can be successfully installed on a device.

BRIEF DESCRIPTION OF DRAWINGS

FIG. 3 is a general diagram depicting a JAR file which contains a virtual machine specification in the JAR file manifest.

DETAILED DESCRIPTION OF EXEMPLARY EMBODIMENTS

The exemplary embodiment enhances device performance and capability by taking advantage of the tags located in an application's file manifest. Besides the application itself, the application provider may also provide an application installer and file manifest. The installer may be programmed to identify an application based on the tags in the application's file manifest. The installer may also be programmed with information regarding the virtual machine in which the identified application should be executed in and a list of virtual machines on the device. If the virtual machine needed to run the application is present, the installer may then be programmed to install the application such that when the application is launched it is executed in the identified virtual machine.

Figure 2:
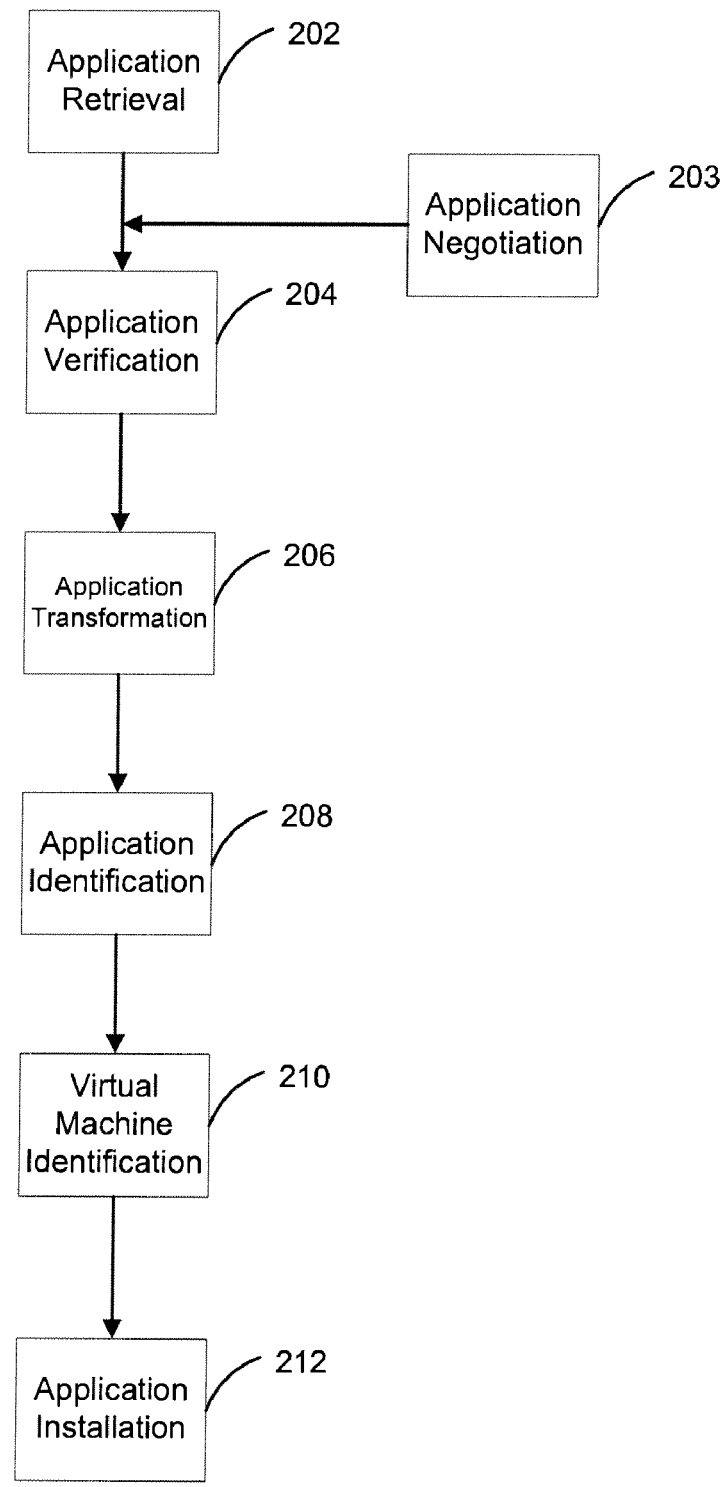
FIG. 2 is a general flow diagram depicting a portion of an installation procedure according to an exemplary embodiment.

Referring to FIG. 2, there is shown a portion of an installation procedure according to an exemplary embodiment. Additional, fewer, or different operations may be performed in alternative embodiments. Before an application can be installed, it must first be retrieved from some source in an operation 202. A device may be able to retrieve applications from multiple transport mediums. For example, a device may support retrieval via a serial cable, an infrared port, or a wireless network. The application management software must support a medium identification step in which the retrieval medium can be selected, either automatically or by user input.

After selecting the retrieval medium, the application management software initiates the negotiation step in an operation 203. In the negotiation step, information about the application and the device is exchanged and compared. This information can include the device's capabilities, the device's memory capacity, and the size of the application. Upon verifying that the device can potentially install the application, the retrieval step commences and the device transfers the application or JAR file containing the application to the device. Besides the application, the JAR file may also contain a manifest file with tags.

Once the JAR file has been retrieved, the installation process may begin. The retrieved application may be verified in an operation 204 to ensure that the application does not violate the device's security policies. For example, a device might enforce a code signing mechanism to validate that the retrieved application is from a trusted source. The next step in installation is operation 206, which is the transformation from the public representation of the application into some device specific, internal representation. This transformation may be as simple as storing a JAR file to persistent storage, or it may actually entail preparing the application to execute directly from non-volatile memory.

At some point during the installation process, the installer identifies the application based on the tags in the file manifest in an operation 208. One way to identify MIDlet applications is to search the file manifest for tags "MIDlet-Name" and "MIDlet-Version". Java Personal Profile applications can be identified by looking for tags "Main-Class" and "PproApp-Name". Also, other tags can be used as long as they are unique to certain kinds of applications. The virtual machine corresponding to the identified application is identified in an operation 210. If the identified virtual machine is present on the device, the installer installs the application such that when the application is launched, it is executed in the identified virtual machine in an operation 212.

Implementing the installation procedure of FIG. 2 allows devices to contain different types of applications, each application executed by a specified virtual machine. For example, a device may have both CDC and CLDC based applications installed on the device, where the CDC based applications are executed in one virtual machine and the CLDC based applications are executed in another virtual machine. The device upon which these applications are installed must have the memory capacity to run the necessary virtual machines. The CDC based application may be installed first according to the process of FIG. 2. In an operation 208, the installer identifies the CDC based application from tags in the file manifest. The installer then identifies the appropriate virtual machine in an operation 210. If the identified virtual machine is on the device, the CDC based application is installed such that when the application is launched it is executed in the identified virtual machine in an operation 212. Next, the CLDC based application may be installed according to the process of FIG. 2. In an operation 208, the installer identifies the CLDC based application from tags in the file manifest. The installer then identifies the appropriate virtual machine in an operation 210. If the identified virtual machine is on the device, the CLDC based application is installed such that when the application is launched it is executed in the identified virtual machine in an operation 212. Optimal application performance can thus be achieved by identifying the virtual machine best suited for the application and installing the application such that it is executed in the identified virtual machine.

The exemplary embodiment of the installation procedure allows for both CDC and CLDC based applications to be installed on the same device, each application being executed in its best suited virtual machine. It will be understood by those having skill in the art that changes can be made to this exemplary embodiment of installation without departing from the spirit and scope of the invention. For instance, the scope is not limited to CDC and CLDC based applications. The installation procedure may be used to install any application with an appropriate virtual machine, regardless of the application's configuration or profile.

Figure 1:
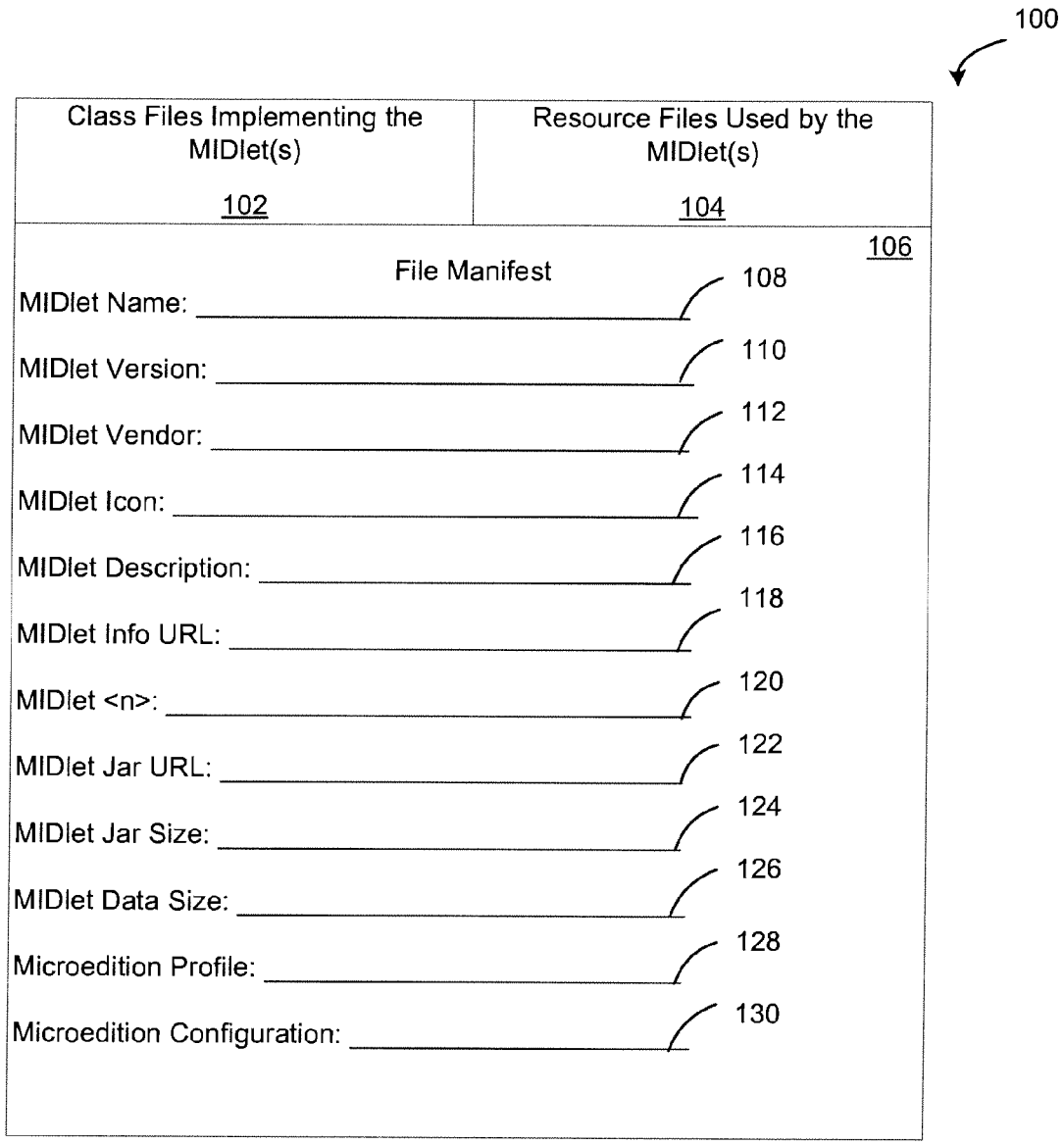
FIG. 1 is a general diagram depicting components of a conventional JAR file.

Referring to FIG. 3, there is shown a general diagram depicting an another embodiment. If there is more than one possible virtual machine that can run an application, a virtual machine specification tag may be placed in the JAR file manifest 306. The JAR file 300 still contains the class files implementing the MIDlet(s) 302, the resource files used by the MIDlet(s) 304, and all of the attributes 308 shown in FIG. 1. In addition to these attributes 308, the JAR file manifest 306 also contains a MIDlet Virtual Machine attribute 310. The MIDlet Virtual Machine attribute 310 may be placed in the JAR file manifest 306 by the application developer. The installer may then be programmed to identify the virtual machine needed to run an application based on the MIDlet Virtual Machine attribute 310 and install the application such that the application is executed in the identified virtual machine each time the application is launched. The embodiment illustrated in FIG. 3 is not limited to MIDlet applications. Additional tags may be used to identify the appropriate virtual machine for an application regardless of the application's configuration or profile.

Figure 4:
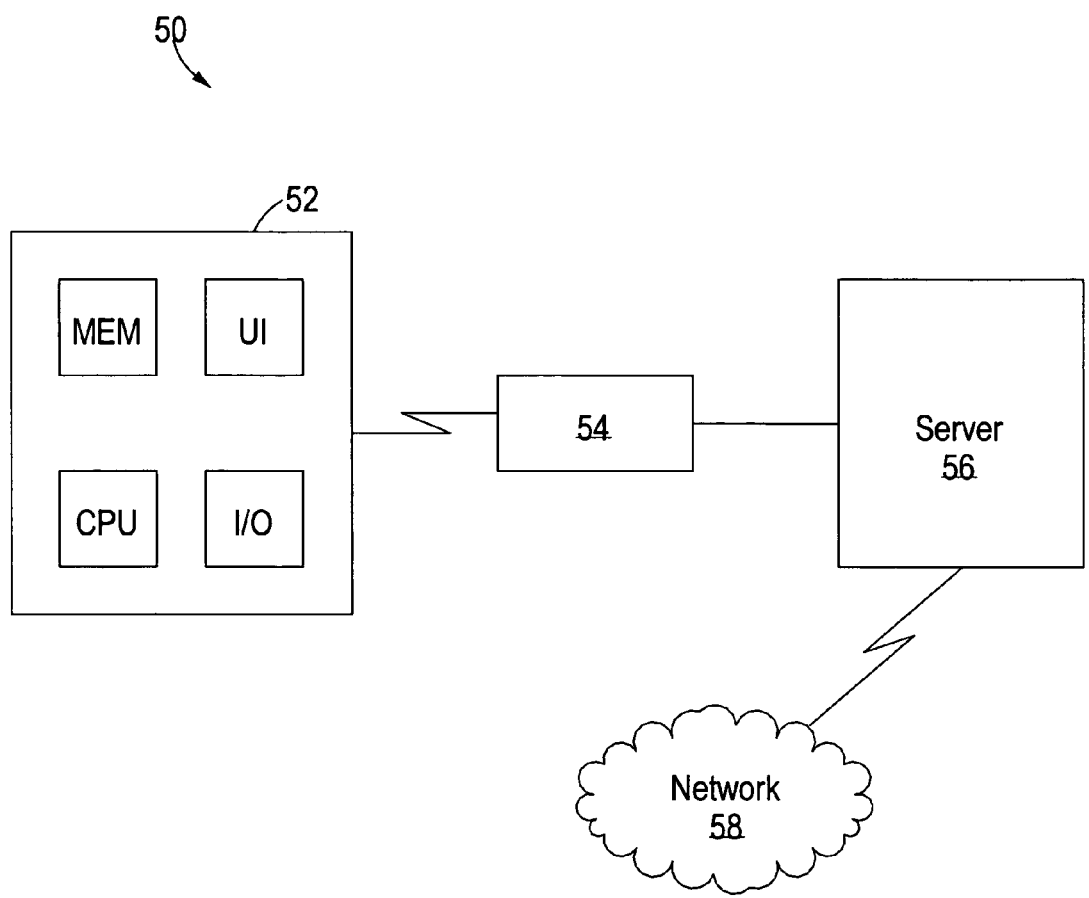
FIG. 4 is a diagram depicting a communication system that utilizes the procedure of FIG. 2.

FIG. 4 illustrates a communication system 50 utilizing an exemplary embodiment of the virtual machine specification and installation procedure described herein. The exemplary embodiments described herein can be applied to any telecommunications system including an electronic device with a speech recognition application, and a server, between which data can be transmitted.

Communication system 50 includes a terminal equipment (TE) device 52, an access point (AP) 54, a server 56, and a network 58. The TE device 52 can include memory (MEM), a central processing unit (CPU), a user interface (UI), and an input-output interface (I/O). The memory can include non-volatile memory for storing applications that control the CPU and random access memory for data processing. Installation utilizing virtual machine specification can be implemented by executing in the CPU programmed instructions stored in the memory. The I/O interface can include a network interface card of a wireless local area network, such as one of the cards based on the IEEE 802.11 standards.

The TE device 52 can be connected to the network 58 (e.g., a local area network (LAN), the Internet, a phone network) via the access point 54 and further to the server 56. The TE device 52 can also communicate directly with the server 56, for instance using a cable, infrared, or a data transmission at radio frequencies. The server 56 can provide various processing functions for the TE device 52.

The TE device 52 can be any portable electronic device, in which speech recognition is performed, for example a personal digital assistant (PDA) device, remote controller or a combination of an earpiece and a microphone. The TE device 52 can be a supplementary device used by a computer or a mobile station, in which case the data transmission to the server 56 can be arranged via a computer or a mobile station. In an exemplary embodiment, the TE device 52 is a mobile station communicating with a public land mobile network, to which also the server 56 is functionally connected. The TE device 52 connected to the network 58 includes mobile station functionality for communicating with the network 58 wirelessly. The network 58 can be any known wireless network, for instance a network supporting the GSM (Global System for Mobile Communications), a network supporting the GPRS (General Packet Radio Service), or a third generation mobile network, such as the UMTS (Universal Mobile Telecommunications System) network according to the 3GPP ($3^{rd}$ Generation Partnership Project) standard. The functionality of the server 56 can also be implemented in the mobile network. The TE device 56 can be a mobile phone used for speaking only, or it can also contain PDA (Personal Digital Assistant) functionality.

While several embodiments of the invention have been described, it is to be understood that modifications and changes will occur to those skilled in the art to which the invention pertains. For example, although particular embodiments and implementations described contemplate use of the installation procedure with a communication device, such as a phone, other electronic devices may also include the functionalities described herein. Moreover, while the exemplary embodiments are described using the Java programming language, any object-oriented programming language may include the functionality as well. The invention is not limited to a particular embodiment, but extends to various modifications, combinations, and permutations that nevertheless fall within the scope and spirit of the appended claims.

What is claimed is:

1. A method of allowing applications to be executed in a specified virtual machine, the method comprising:
    identifying an application;
    identifying a virtual machine best suited to execute the application: and
    installing the application, wherein the application is executed in the identified virtual machine when the application is launched;
wherein an application installer is programmed to:
    perform the identifying of the application;
    perform the identifying of the virtual machine best suited to execute the application; and
    perform the installing of the application such that the application is executed in the identified virtual machine when the application is launched.

2. The method of claim 1, wherein a virtual machine specification is placed in an application's file manifest.

3. The method of claim 2, wherein the virtual machine specification is an attribute in the application's file manifest.

4. The method of claim 2, wherein the virtual machine specification is placed in the application's file manifest by an application developer.

5. The method of claim 1, wherein a processor is programmed to check for and identify a virtual machine specification.

6. The method of claim 1, wherein the application installer is placed in a distribution package corresponding to the application.

7. The method of claim 1, wherein the application is a Java application.

8. A system for allowing an application to be executed in a specified virtual machine, the system comprising:
    memory configured to contain an application and a virtual machine; and
    a processor configured to execute instructions, wherein the instructions:
        identify the application;
        identify the virtual machine best suited to execute the application; and
        install the application such that when the application is launched, the application is executed in the identified virtual machine;
    wherein the processor executes an application installer, whereby the application installer is programmed to:
        perform the identifying of the application;
        perform the identifying of the virtual machine best suited to execute the application; and
        perform the installing of the application such that the application is executed in the identified virtual machine when the application is launched.

9. The system of claim 8, wherein a virtual machine specification is placed in an application's file manifest.

10. The system of claim 9, wherein the virtual machine specification is an attribute in the application's file manifest.

11. The system of claim 9, wherein the virtual machine specification is placed in the application's file manifest by an application provider.

12. The system of claim 8, wherein the application installer is placed in a distribution package corresponding to the application.

13. A device that utilizes virtual machine specification, the device comprising:
    memory configured to contain an application and a virtual machine; and
    a processor configured to execute instructions, wherein the instructions:
        identify the application;
        identify the virtual machine needed to execute the application;
        and install the application such that when the application is launched, the application is executed in the identified virtual machine;
    wherein the processor executes an application installer, whereby the application installer is programmed to:
        perform the identifying of the application;
        perform the identifying of the virtual machine best suited to execute the application; and
        perform the installing of the application such that the application is executed in the identified virtual machine when the application is launched.

14. The device of claim 13, wherein the device provides a user interface that allows installation of the application.

15. The device of claim 13, wherein the device is a mobile device.

16. The device of claim 13, wherein a virtual machine specification is placed in an application's file manifest.

17. The device of claim 16, wherein the virtual machine specification is an attribute in the application's file manifest.

18. The device of claim 16, wherein the virtual machine specification is placed in the application's file manifest by an application developer.

19. The device of claim 13, wherein the application installer is placed in a distribution package corresponding to the application.

20. The device of claim 13, wherein the application is Java application.

* * * * *